Oct. 11, 1960 C. E. HOADLEY 2,955,631
SHEARING HEAD STRUCTURE
Filed May 28, 1958 3 Sheets-Sheet 1
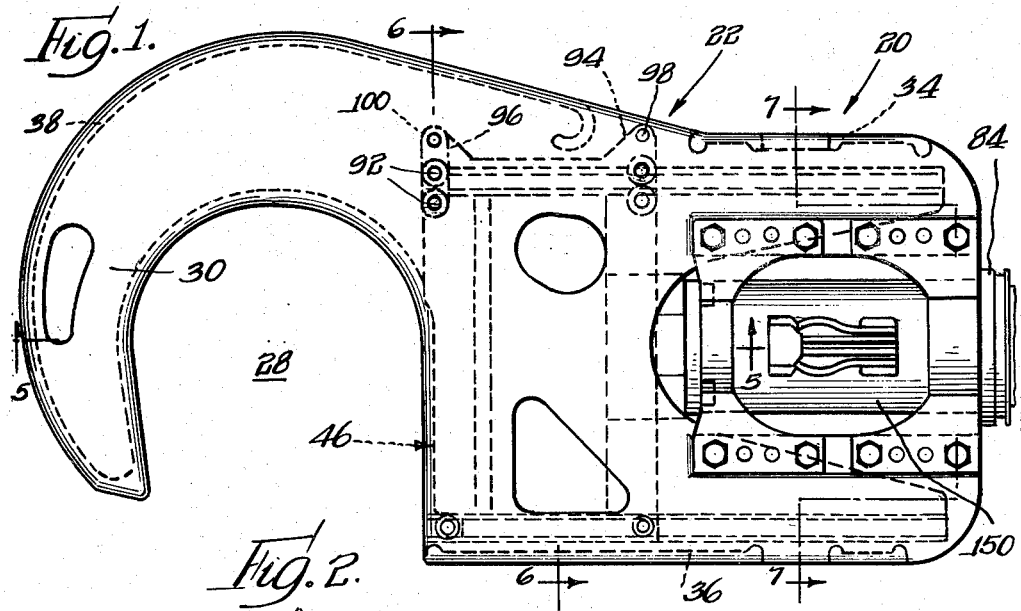
INVENTOR.
Cyrus Earl Hoadley
BY:
Olson & Trexler
attys.

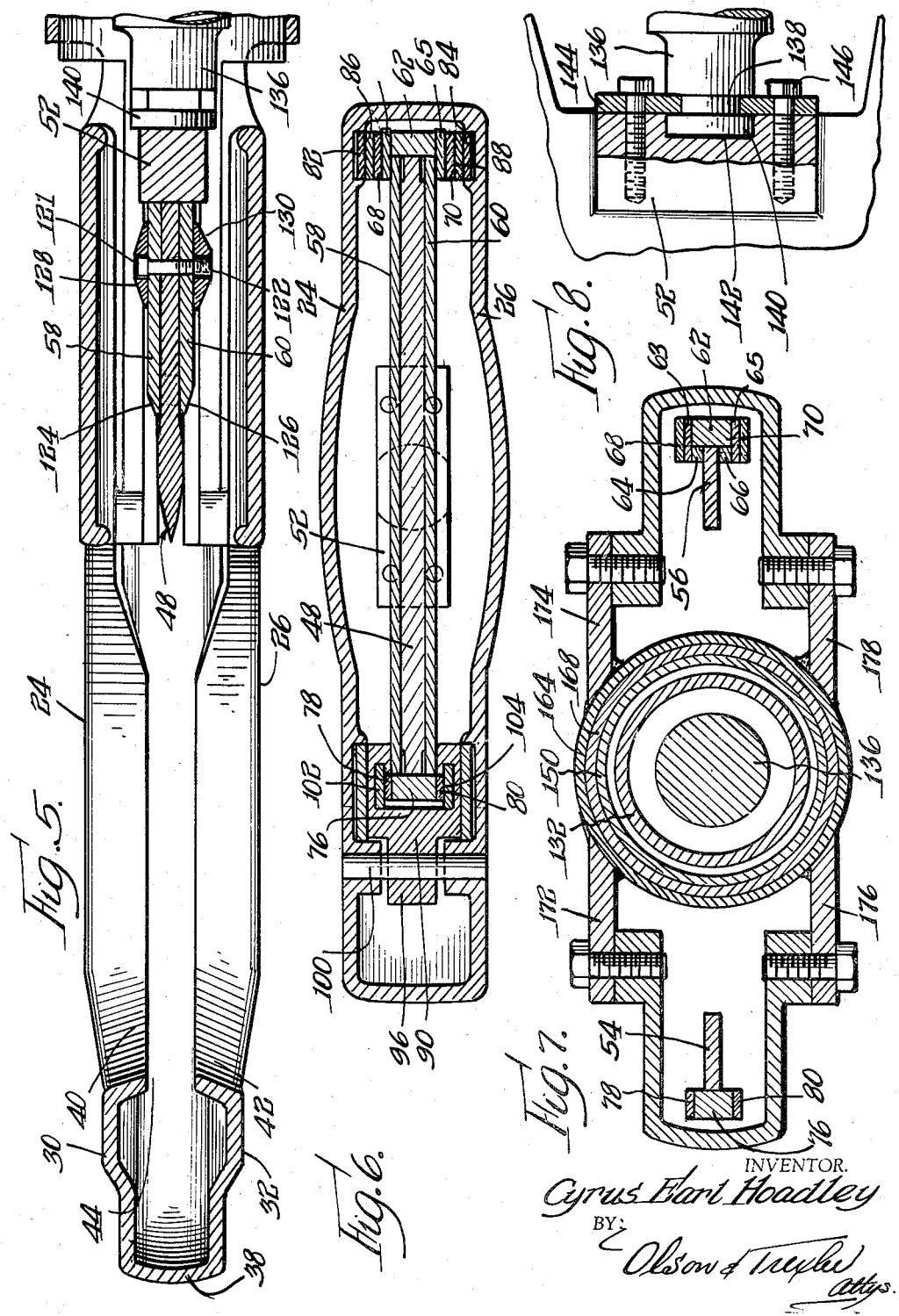

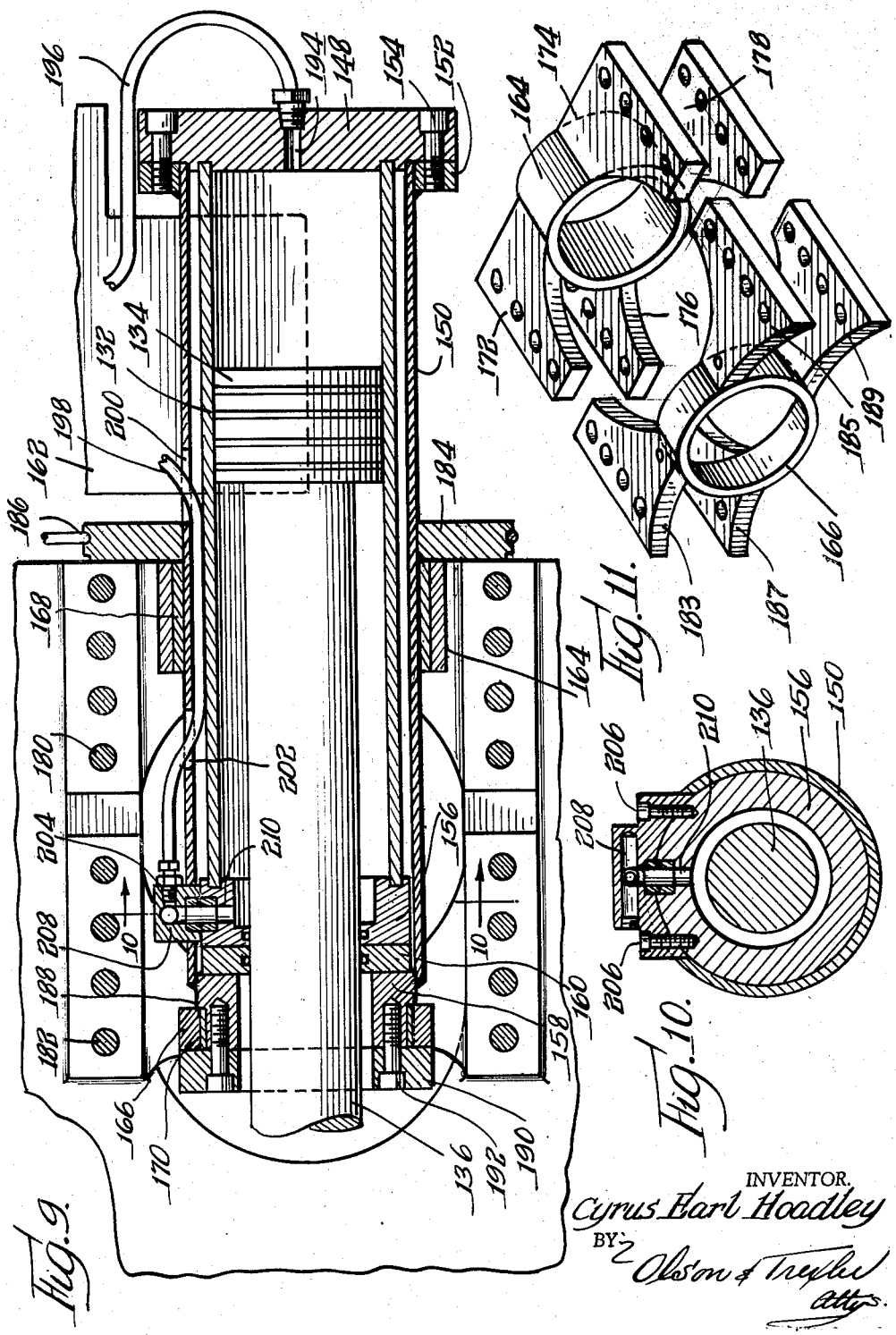

United States Patent Office 2,955,631
Patented Oct. 11, 1960

2,955,631

SHEARING HEAD STRUCTURE

Cyrus Earl Hoadley, Kankakee, Ill., assignor to Timberline Equipment Company, Bradley, Ill., a corporation of Illinois Filed May 28, 1958, Ser. No. 738,471

14 Claims. (Cl. 144—34)

The present invention relates to a novel apparatus for severing trees and the like, and more particularly to a novel hydraulically operated head structure adapted to shear trees and the like.

It will be appreciated that in order to force a shearing blade through the trunk of a tree, a large amount of power must be applied to the blade and the shearing head structure is subjected to considerable stresses and strains. It is therefore an important object of the present invention to provide a novel shearing head structure for severing trees and the like which is of rugged and durable construction and relatively easily and economically manufactured and maintained.

A more specific object of the present invention is to provide a novel shearing head structure for harvesting trees and the like wherein shearing blade means is constructed and supported in a manner which promotes efficient operation and reduces any possibility of binding or deflection of the blade means during a severing operation.

Another object of the present invention is to provide a novel shearing head structure for tree harvesting apparatus having simple and rugged support means such that a hydraulic cylinder of the head structure may be connected with fluid pressure lines and the head structure may be readily rotated about its longitudinal axis to various desired adjusted positions.

Other objects and advantages of the present invention will become apparent from the following description and the accompanying drawings wherein:

Fig. 1 is a fragmentary plan view showing a shearing head structure incorporating features of the present invention;

Fig. 2 is an exploded plan view showing shearing blade means utilized in the head structure of the present invention;

Fig. 3 is an edge view of the portion of the head structure shown in Fig. 1;

Fig. 4 is an enlarged fragmentary cross sectional view taken along line 4—4 in Fig. 2;

Fig. 5 is an enlarged fragmentary cross sectional view taken along line 5—5 in Fig. 1;

Fig. 6 is an enlarged cross sectional view taken along line 6—6 in Fig. 1;

Fig. 7 is an enlarged cross sectional view taken along line 7—7 in Fig. 1;

Fig. 8 is an enlarged fragmentary view partially broken away in order to show the manner in which the shearing blade means may be connected with a ram of a hydraulic motor;

Fig. 9 is a fragmentry view partially broken away and showing particularly the hydraulic cylinder of the shearing head structure and the manner in which the shearing head structure is supported;

Fig. 10 is a fragmentary sectional view taken along line 10—10 in Fig. 9; and

Fig. 11 is a perspective view showing a portion of the shearing head mounting means.

Referring now more specifically to the drawings wherein like parts are designated by the same numerals throughout the various figures, a shearing head 20 incorporating features of the present invention is provided with a frame 22 which is preferably cast. The frame 22 has opposite side portions 24 and 26 which are formed to provide a laterally opening recess 28 in the head frame adapted to receive a tree or the like to be severed. In other words the opposite sides of the frame are formed with hook portions 30 and 32 (Figs. 3 and 5) adapted to extend around a tree to be severed. The opposite sides 24 and 26 are integrally joined with each other by opposite peripheral sections 34 and 36, and another peripheral section 38 extends around and joins the outer margins of the hook portions 30 and 32. As shown in Figs. 3 and 5, inner margins of the hook portions are provided with inturned flanges 40 and 42 which serve to strengthen and rigidify the frame structure and which have free edges spaced apart for providing a slot 44 adapted to accommodate blade means of the shearing head structure described below.

The shearing head structure is provided with blade means 46 which comprises a sharpened blade member 48 adapted to be detachably connected to and supported by a carrier assembly 50. The carrier assembly comprises a central block 52 to which oppositely disposed laterally and rearwardly extending tail members 54 and 56 are welded. A pair of plate members 58 and 60 overlap forward marginal portions of opposite surfaces of the tail members 54 and 56, which plate members are welded to the tail members and also to the block 52. The plate members 58 and 60 are spaced from each other by the tail members so as to provide a recess for receiving a portion of the blade member 48. As shown in Figs. 2, 6 and 7 opposite margins of the carrier assembly are strengthened and provided with longitudinally extending bearing means. More specifically, a longitudinally extending member 62 is disposed between and welded to margins of the plate members 58 and 60, which members 62 will traverse the open mouth of the recess 28 when the blade means is extended during a severing operation. The member 62 also extends along and is welded to the margin of the tail member 56. Strips 64 and 66, see Fig. 7, are welded to opposite sides of the tail member 56 and to the longitudinally extending member 62, which strips have the same thickness as the plate members 58 and 60 so that they combine with the plate members to support longitudinally extending bars 63 and 65 on which bearing strips 68 and 70 are placed. These bearing strips may be welded or otherwise suitably secured in position. It is to be noted that the plate members 58 and 60 have forwardly projecting corner portions which combine together with the forward end of the member 62 to provide point means 72 (Fig. 2) having a slot 74 in a side thereof for receiving and supporting a forward corner portion of the blade member 48 and for minimizing any possibility of the blade means being snagged by the ground or some other obstacle during a severing operation. As shown in Fig. 2 the forward ends of the strips 63 and 68 are tapered and beveled to provide shapes complementary to the point means 72, and it is understood that the forward ends of the strips 66 and 70 are similarly tapered and beveled.

The margin of the carrier assembly which extends along the closed side of the cutter head frame is provided by a longitudinally extending member 76 which is welded to margins of the tail member 54 and the plate members 58 and 60. Bearing strips 78 and 80 are suitably welded or otherwise secured to opposite longitudinally extending surfaces of the member 76. As shown in the drawings, forward ends of the member 76 and the bearing strips 78 and 80 extend forwardly of the plate members 58 and 60 substantially the same amount as the point means 74, and a lateral slot 82 is provided in the forwardly extending end portion of the member 76 for receiving and supporting a forward marginal portion of the blade member 48.

In order to support the carrier assembly slidably within the cutter head frame, longitudinally extending members 82 and 84 are secured within the frame sides 24 and 26 by any suitable means such as welding or screws. Bearing strips 86 and 88 are respectively welded or otherwise secured to the members 82 and 84 for cooperative engagement with the bearing strips 68 and 70. In addition an elongated bearing support block 90 (Fig. 6) is disposed along the closed side of the head frame, which block is secured in position by a plurality of screws 92 (Fig. 1). Ears 94 and 96 extend laterally from the block and are provided with apertures for receiving locating pins 98 and 100 which also project through locating apertures and the head frame. The bearing block is provided with a longitudinally extending slot which receives the carrier member 76 and the carrier bearing strips 78 and 80, and complementary bearing strips 102 and 104 are secured to opposite sides of the slot.

The blade member 48 has a sharpened leading marginal portion 106 which substantially traverses the blade member. However, it is to be noted, that opposite leading marginal corner portions 108 and 110 of the blade member are not sharpened, which corner portions are adapted to project into the above mentioned slots 74 and 82 in the carrier assembly so that the opposite corners of the blade are supported to resist bending or breaking of the blade. As shown in Fig. 4, the sharpened leading marginal portion 106 of the blade has a leading edge section 112 which is formed with a relatively large included angle between its opposite side surfaces so that the cutting edge is well supported for resisting damage thereto as the blade is forced through a tree. The included angle between opposite surfaces of the blade section 112 should be between about 30° and 45°. However in order to reduce the resistance to passage of the blade through a tree it is desirable to reduce the included angle between opposite surfaces of the blade and therefore the leading marginal portion 106 is provided with a section 114 immediately following the section 112, which section 114 has a reduced included angle. Another section 116 of the blade has a further reduced included angle between opposite sides thereof and this section merges with a full thickness section 118 having parallel opposite side surfaces. Resistance to the passage of the blade through the tree is further reduced by generously rounding the junctions between the various sections of the blade. The blade member 48 has a trailing section 120 which is adapted to extend between the plate members 58 and 60 of the carrier assembly as shown in Figs. 5 and 6. A plurality of complementary bolts 121 and nuts 122 extend through aligned apertures in the plate members 58 and 60 and the blade section 120 for securing the blade member in position.

It will be appreciated that the shearing blade member 48 will not only serve to sever a tree or the like, but the sharpened portion of the blade will also serve as a wedge for directing the fall of a standing tree. A further wedging action is obtained by the plate members 58 and 60 of the carrier assembly which plate members are provided with beveled forward margins 124 and 126. It is also to be noted that the trailing section 120 of the blade is reduced in thickness as compared with the section 118 so that the beveled surfaces 124 and 126 extend substantially to the opposite surfaces of the section 118 as shown best in Fig. 5. This not only aids in the wedging action which serves to direct the fall of a tree, but also aids in preventing splinters of a tree being severed from being forced between the plate members 58 and 60 and the blade member. Additional wedging action is obtained by bosses 128 and 130 which are welded to opposite sides of the plate members 58 and 60 and are provided with beveled peripheries. These bosses also serve to enclose the heads of the bolts 120 and the nuts 122 so as to prevent these elements from snagging a tree during a severing operation.

In order to actuate the blade means, the shearing head structure is provided with a reciprocable hydraulic motor which comprises a cylinder 132 (Fig. 9) having a piston 134 reciprocable therein which piston is connected with a rod or ram 136. As shown best in Figs. 2, 5 and 8, the forward end of the ram 136 is provided with a reduced neck portion 138 and an enlarged head 140. The head 140 is adapted to be received in a suitable recess 142 formed in the block 52 of the carrier assembly. A cover plate 144 is secured to the block 52 by a plurality of screws 146, which cover plate has an aperture therein with a diameter similar to the diameter of the reduced neck portion 138 of the ram so that the plate member 144 serves to retain the head 140 within the recess and thereby providing a positive and rotary connection between the ram and the carrier.

One end of the cylinder 132 is closed by an end plate 148. A sleeve 150 surrounds the cylinder 132 and has an annular ring 152 welded thereto. The end plate 148 is held against the end of the cylinder 132 by means of a plurality of screws 154 extending through the end plate and threaded into suitable apertures in the annular member 152. The rod end of the cylinder 132 is closed by means of an annular member 156. This member is held against the end of the cylinder by means of an abutment ring 158 welded to the adjacent end of the sleeve 150 and a spacer ring 160. It will be appreciated that when the screws 154 are tightened, the opposite end members of the hydraulic motor are drawn together and the sleeve 150 provides the connecting means between the end members.

The sleeve 150 not only serves to retain the opposite ends of the hydraulic motor but also serves as a portion of the means for rotatably supporting the shearing head structure. More specifically, the sleeve 150 is welded or otherwise secured to bracket means 162 which bracket means is supported by suitable apparatus, not shown. Reference is hereby made to application Serial No. 681,044, filed August 29, 1957 for an apparatus suitable for incorporating the shearing head structure disclosed herein. It will be appreciated that the sleeve 150 when welded to the bracket 162, is held against rotation. Thus bearing means is provided between the sleeve and the remainder of the shearing head structure so that the major portion of the shearing head structure may be rotated about the sleeve. More specifically, outer bearing rings 164 and 166 are provided for rotatably receiving and supporting inner bearing rings 168 and 170 respectively secured to the sleeve 150 and to a portion of the annular abutment member 158. The ring 164 is welded to a pair of upper ears 172 and 174 and also to a pair of lower ears 176 and 178. These ears are provided with a plurality of apertures for receiving bolts or screws 180 that are threaded into complementary apertures in the opposite sides of the shearing head frames for securing the bearing ring 164 with respect to the frame. The ring 166 is welded to similar ears 183, 184, 187 and 189 which are also secured by means of screws 182 to opposite sides of the shearing head frame. Any suitable means such as a pulley 184 secured to the end of the shearing head frame and encircled by a suitable flexible drive element 186 is provided for rotating the shearing head frame about the sleeve 150. In order to prevent axial shifting of the frame with respect to the sleeve 150, the annular abutment member 158 is provided with a thrust bearing shoulder portion 188 engageable with one side of the bearing member 166. A thrust ring 190 is secured by means of screws 192 to the annular member 158 for engaging the opposite side of the bearing 166.

Hydraulic fluid is supplied to or drained from the piston end of the cylinder 132 through a passageway 194 in the end plate 148. A suitable hydraulic conduit 196 is connected with the end plate 148 and the passageway 194. Another hydraulic conduit 198 is provided for communicating with the rod end of the cylinder. This conduit extends through an aperture 200 in the sleeve 150 adjacent the support bracket means 162 and then forwardly between the sleeve and the cylinder. The conduit 198 is thus directed past the bearings 164 and 168. Then the conduit 198 passes to the exterior of the tube 150 through another opening 202 and is connected with a fitting 204 which extends through a complementary recess in the sleeve 150 and is secured to the end member 156 by screws 206 (Fig. 10). The fitting 204 has a passageway 208 extending between the conduit 198 and a passageway 210 in the end member 156.

With the above described structure, it will be apparent that the shearing head frame may be readily rotated so as to position the blade for severing upright standing trees or trees lying on the ground or trees disposed at any angle to the ground. Furthermore it will be appreciated that a rugged and rigid structure has been provided so that the shearing blade means may be advanced or retracted without binding in the frame structure. In this connection it is to be noted that the bearing elements secured to the shearing head frame terminate short of the hook portions of the frame. The hook portion of the shearing head frame is subject to some deflection during a severing operation and the arrangement of the bearing elements eliminates any possibility of the bearing elements being deflected and causing binding of the blade means. It is further seen that the present invention has provided a blade assembly which is of durable construction and which is also constructed so that the blade member may readily be replaced in the event that it does become damaged.

While the preferred embodiment of the present invention has been shown and described herein, it is obvious that many structural details may be changed without departing fro mthe spirit and scope of the appended claims.

The invention is claimed as follows:

1. A shearing head structure for severing trees and the like comprising frame means having a lateral opening therein for receiving a tree and a hook portion for extending around a tree to be severed, blade means reciprocably mounted on said frame means for traversing said opening and severing a tree, said blade means comprising a carrier assembly, and a separate blade member secured to said carrier assembly and having a sharpened leading edge, said sharpened leading edge terminating short of opposite leading corner portions of said blade member, said opposite leading corner portions extending forwardly at least substantially as far as and being substantially thicker than said sharpened leading edge, and said carrier assembly including a pair of means extending forwardly at least substantially as far as said leading edge and receiving and supporting said corner portions of said blade member, one of said last named means being disposed for traversing a mouth of said lateral opening when the blade means is moved across said opening during a severing operation for reducing any possibility of injury to the blade means during a severing operation.

2. A shearing head structure, as defined in claim 1, wherein said one means being substantially pointed for further reducing any possibility of injury to the blade means during a severing operation.

3. A shearing head structure, as defined in claim 1, wherein said carrier assembly includes elongated bearing means disposed along opposite margins thereof and cooperable with complementary bearing means on said frame means for reciprocably supporting said blade means.

4. A shearing head structure, as defined in claim 1, wherein said carrier assembly includes plate means overlapping a trailing section of said blade member, said plate means having beveled leading edge means for promoting wedging of a tree during a severing operation.

5. A shearing head structure, as defined in claim 4, wherein said trailing blade section is reduced in thickness as compared with an immediately preceding blade section, said beveled leading edge means of said overlapping plate means approaching said preceding blade section so as to resist any tendency of chips or the like of a tree to be forced between the blade member and said plate means during a severing operation.

6. A shearing head structure, as defined in claim 4, which includes bolt means extending through said overlapping plate means and said trailing blade section for securing said blade member and said plate means together, and boss means having beveled peripheral portions secured to said plate means and surrounding a head portion of said bolt means for increasing the wedging action during a tree severing operation and for protecting the bolt means head portion from a tree being severed.

7. A shearing head structure, as defined in claim 1, which includes elongated bearing means on said frame means for slidably supporting said shearing blade means, said bearing means terminating short of said hook portion for preventing deflection of the bearing means and possible binding of the blade means during a shearing operation.

8. A shearing head structure for severing trees and the like comprising frame means having a lateral opening therein for receiving a tree to be severed and a hook portion for projecting around a tree to be severed, and blade means reciprocably mounted on said frame means for traversing said opening to sever a tree, said blade means comprising a carrier assembly and a separate sharpened blade member secured to said carrier assembly, said blade member having a trailing section, said trailing section having a surface recessed below the surface of an immediately preceding section, said carrier assembly including plate means overlapping said blade member trailing section surface and terminating short of said preceding blade member section so as to resist any tendency for chips or the like of a tree to be forced between said plate means and said trailing blade member section during a severing operation.

9. A shearing head structure for severing trees and the like comprising frame means having a first portion, said frame means having a lateral opening therein for receiving a tree to be severed and a hook portion extending from said first portion for projecting around a tree to be severed, shearing blade means reciprocably mounted on said first frame means portion for movement across said opening and toward and away from said hook portion for severing a tree, elongated bearing means on said first frame means portion for guiding said blade means, said bearing means terminating short of said hook portion for preventing deflection of the bearing means during a shearing operation, said blade means including a carrier assembly and a separate sharpened blade member detachably secured to said carrier assembly, said blade member having a sharpened leading edge terminating short of opposite leading corners of the blade member, said carrier assembly including a pair of means receiving and supporting said opposite corner portions of said blade member, a hydraulic motor for actuating said blade means and including a double acting cylinder, opposite end members closing said cylinder and ram means reciprocable within said cylinder and connected with said blade means, a sleeve surrounding said cylinder and connected to said opposite end members for retaining said end members in assembled relationship with said cylinder, a portion of said sleeve extending rearwardly of said frame means and adapted to be fixed to support means, and inner and outer cooperating bearing means respectively supported by said sleeve and mounted on said frame means for supporting said frame means for rotation about said sleeve.

10. A shearing head structure for severing trees and the like comprising frame means having a lateral opening therein for receiving a tree to be severed and a hook portion for projecting partially around a tree disposed within said opening, shearing blade means reciprocably mounted on said frame means for traversing said opening and severing a tree disposed therein, a hydraulic motor for actuating said blade means and including a cylinder, opposite end members closing said cylinder and ram means reciprocable within said cylinder and connected with said blade means, a sleeve surrounding said cylinder and connected to said opposite end members for retaining said end members in assembled relationship with said cylinder, a portion of said sleeve extending rearwardly of said frame means and adapted to be fixed to support means, and inner and outer cooperating annular bearing means respectively supported by said sleeve and mounted on said frame means for supporting said frame means for rotation about said sleeve.

11. A shearing head structure, as defined in claim 10, wherein said ram means and said carrier assembly include coopearting elements providing a rotary connection between the carrier assembly and the ram means.

12. A shearing head structure, as defined in claim 10, which includes an annular abutment member retaining one of said end members, said sleeve being secured to said abutment member for retaining the abutment member, and means detachably connecting the other of said end members to said sleeve.

13. A shearing head structure, as defined in claim 10, wherein said sleeve has an inside diameter greater than the outside diameter of said cylinder for providing an annular space between said cylinder and the sleeve, said shearing head structure including hydraulic conduit means extending through an opening in said portion of the sleeve, then within and past a portion of said bearing means and then communicating with the ram end of said cylinder.

14. A shearing head structure, as defined in claim 10, wherein said inner and outer bearing means comprise a first inner bearing ring mounted on said sleeve and a first outer bearing ring connected with said frame means and engaging said first inner ring, an annular abutment member retaining one of said end members and secured to an end of said sleeve adjacent the ram end of said cylinder, a second inner bearing ring on said abutment member and a second outer bearing ring mounted on said frame means and cooperable with said second inner ring, and axially spaced oppositely facing thrust bearing means carried by said abutment member and engageable with oppositely facing surfaces of said second outer ring for resisting movement of said frame means axially of said sleeve.

References Cited in the file of this patent
UNITED STATES PATENTS

| | | |
|---|---|---|
| 944,555 | Holden | Dec. 28, 1909 |
| 2,269,914 | Parker | Jan. 13, 1942 |
| 2,385,419 | Matulich | Sept. 25, 1945 |
| 2,493,696 | Potstada | Jan. 3, 1950 |
| 2,751,943 | Ford | June 26, 1956 |
| 2,845,101 | Hoadley | July 29, 1958 |

FOREIGN PATENTS

| | | |
|---|---|---|
| 139,716 | Australia | Dec. 15, 1950 |